(12) United States Patent
Reagan et al.

(10) Patent No.: US 9,473,417 B2
(45) Date of Patent: Oct. 18, 2016

(54) CONTROLLING RESOURCES USED BY COMPUTING DEVICES

(71) Applicant: SKY SOCKET, LLC, Atlanta, GA (US)

(72) Inventors: Spencer Gibson Reagan, Atlanta, GA (US); John Joseph Manton, Alpharetta, GA (US)

(73) Assignee: AirWatch LLC, Palo Alto, CA (US)

( * ) Notice: Subject to any disclaimer, the term of this patent is extended or adjusted under 35 U.S.C. 154(b) by 425 days.

(21) Appl. No.: 13/830,391

(22) Filed: Mar. 14, 2013

(65) Prior Publication Data

US 2014/0280934 A1    Sep. 18, 2014

(51) Int. Cl.
*G06F 15/173* (2006.01)
*H04L 12/911* (2013.01)
*H04L 29/08* (2006.01)

(52) U.S. Cl.
CPC .............. *H04L 47/70* (2013.01); *H04L 67/141* (2013.01)

(58) Field of Classification Search
CPC .. H01J 13/02; H01J 2893/0073; H04L 47/70
USPC ................................. 709/223, 225, 203, 208
See application file for complete search history.

(56) References Cited

U.S. PATENT DOCUMENTS

| | | | |
|---|---|---|---|
| 5,864,683 A | 1/1999 | Boebert et al. |
| 5,928,329 A | 7/1999 | Clark et al. |
| 5,961,590 A | 10/1999 | Mendez et al. |
| 5,974,238 A | 10/1999 | Chase, Jr. |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,269,369 B1 | 7/2001 | Robertson |
| 6,463,470 B1 | 10/2002 | Mohaban et al. |
| 6,560,772 B1 | 5/2003 | Slinger |
| 6,606,662 B2 | 8/2003 | Nagasaki |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |

(Continued)

OTHER PUBLICATIONS

Non-Final Office Action cited in U.S. Appl. No. 13/316,073 dated Jan. 18, 2013.

*Primary Examiner* — Glenford Madamba

(57) ABSTRACT

Methods, systems, and devices provide control over resources used by computing devices. In some embodiments, a management application determines that multiple computing devices are available for management. The management application determines that each of the computing devices is executing a respective instance of a client application. The client application can communicate with the management application and control at least one computing resource of each computing device. The management application configures the computing resource of each computing device such that the computing device is restricted to accessing at least one common resource. The computing device is configured via communication between the management application and the respective instance of the client application.

20 Claims, 7 Drawing Sheets

(56) References Cited

U.S. PATENT DOCUMENTS

| | | | |
|---|---|---|---|
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasin | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,150,431 B2 | 4/2012 | Wolovitz et al. | |
| 8,166,106 B2 | 4/2012 | Biggs et al. | |
| 8,682,960 B2* | 3/2014 | Strandell et al. | 709/203 |
| 8,867,991 B2* | 10/2014 | Forutanpour et al. | 455/41.1 |
| 2002/0013721 A1 | 1/2002 | Dabbiere et al. | |
| 2002/0055967 A1 | 5/2002 | Coussement | |
| 2003/0110084 A1 | 6/2003 | Eberhard et al. | |
| 2003/0172166 A1 | 9/2003 | Judge et al. | |
| 2003/0204716 A1 | 10/2003 | Rockwood et al. | |
| 2004/0123153 A1 | 6/2004 | Wright et al. | |
| 2004/0148375 A1* | 7/2004 | Levett et al. | 709/223 |
| 2004/0181687 A1 | 9/2004 | Nachenberg et al. | |
| 2004/0224703 A1 | 11/2004 | Takaki et al. | |
| 2005/0246192 A1 | 11/2005 | Jauffred et al. | |
| 2006/0129670 A1* | 6/2006 | Mayer | 709/223 |
| 2006/0190984 A1 | 8/2006 | Heard et al. | |
| 2007/0033397 A1 | 2/2007 | Phillips, II et al. | |
| 2007/0136492 A1 | 6/2007 | Blum et al. | |
| 2007/0156897 A1 | 7/2007 | Lim | |
| 2007/0174433 A1 | 7/2007 | Mendez et al. | |
| 2007/0288637 A1 | 12/2007 | Layton et al. | |
| 2008/0133712 A1 | 6/2008 | Friedman et al. | |
| 2008/0134305 A1 | 6/2008 | Hinton et al. | |
| 2008/0201453 A1 | 8/2008 | Assenmacher | |
| 2008/0270587 A1* | 10/2008 | Mason et al. | 709/223 |
| 2009/0036111 A1 | 2/2009 | Danford et al. | |
| 2009/0144632 A1 | 6/2009 | Mendez | |
| 2009/0198997 A1 | 8/2009 | Yeap et al. | |
| 2009/0260064 A1 | 10/2009 | McDowell et al. | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005159 A1 | 1/2010 | Ishiguro | |
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0144323 A1 | 6/2010 | Collins et al. | |
| 2010/0146269 A1 | 6/2010 | Baskaran | |
| 2010/0205643 A1* | 8/2010 | Raftelis et al. | 725/110 |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |
| 2011/0004941 A1 | 1/2011 | Mendez et al. | |
| 2011/0082900 A1* | 4/2011 | Nagpal | H04W 8/245 709/203 |
| 2011/0106878 A1* | 5/2011 | Cho et al. | 709/203 |
| 2011/0113062 A1 | 5/2011 | Quinlan et al. | |
| 2011/0145385 A1* | 6/2011 | Liu | 709/223 |
| 2011/0145932 A1 | 6/2011 | Nerger et al. | |
| 2011/0153779 A1 | 6/2011 | Mendez et al. | |
| 2011/0167474 A1 | 7/2011 | Sinha et al. | |
| 2011/0202589 A1 | 8/2011 | Piernot et al. | |
| 2011/0225252 A1 | 9/2011 | Bhat et al. | |
| 2011/0270799 A1 | 11/2011 | Muratov | |
| 2011/0276805 A1 | 11/2011 | Nagpal et al. | |
| 2011/0296186 A1 | 12/2011 | Wong et al. | |
| 2011/0320552 A1 | 12/2011 | Friedman et al. | |
| 2012/0005578 A1 | 1/2012 | Hawkins | |
| 2012/0005717 A1* | 1/2012 | Ansari et al. | 725/153 |
| 2012/0015644 A1 | 1/2012 | Danford et al. | |
| 2012/0102392 A1 | 4/2012 | Reesman et al. | |
| 2012/0198547 A1 | 8/2012 | Fredette et al. | |
| 2013/0152169 A1 | 6/2013 | Stuntebeck | |
| 2014/0007214 A1* | 1/2014 | Qureshi et al. | 726/12 |
| 2014/0032759 A1* | 1/2014 | Barton et al. | 709/225 |
| 2014/0089487 A1* | 3/2014 | Debate | 709/223 |

\* cited by examiner

CONTROLLING RESOURCES USED BY COMPUTING DEVICES

TECHNICAL FIELD

This disclosure relates generally to computer-implemented methods and systems for remote device management and more particularly relates to controlling resources provided by a server system and used by computing devices.

BACKGROUND

Electronic content provided via a network, such as documents or applications, may be used to enhance collaborative projects between multiple users or to provide electronic content to a widespread audience. For example, video content and other multimedia presentations can be used to provide instructions, augment lectures, and otherwise enhance projects involving multiple participants.

Prior solutions for providing electronic content to multiple participants may involve providing computing devices for use by each participant that are fully controlled by a provider of the electronic content. For example, passenger safety videos may be provided on an airplane via monitors connected to a video player via a wired network. Prior solutions for providing electronic content to multiple participants may alternatively rely on participants performing one or more voluntarily actions to obtain the electronic content. For example, sharing content via a web meeting may require each participant in the web meeting to manually log into the meeting and access the desired content.

Systems and methods are desirable for temporarily controlling independently operated computing devices to provide electronic content to users of the computing devices.

SUMMARY

Systems, devices, and methods for controlling resources used by computing devices are described.

In some embodiments, a method performed by a management application is provided. The method involves determining that multiple computing devices are available for management. The method further involves determining that each of the computing devices is executing a respective instance of a client application. The client application can communicate with the management application and control at least one computing resource of each computing device. The method further involves configuring the computing resource of each computing device such that the computing device is restricted to accessing at least one common resource. The computing device is configured via communication between the management application and the respective instance of the client application.

In some embodiments, a system is provided. The system includes at a processor, a touch screen device communicatively coupled to the processor, and a computer-readable medium communicatively coupled to the processor. The processor can execute a management application embodied in the non-transitory computer-readable medium to perform operations. The operations include determining that each of multiple computing devices is executing a respective instance of a client application. The client application can communicate with the management application and can control at least one respective computing resource of the computing device. The operations also include selecting at least one of the computing devices based on at least one input received to the touch screen device. The operations also include configuring at least one respective computing resource of the managed computing device(s) such that the computing device(s) are restricted to accessing at least one resource managed by the management application. The computing device(s) are configured via communication between the management application and an instance of the client application executed at the managed computing device.

In some embodiments, a system is provided. The system includes at a processor, an input device communicatively coupled to the processor, and a non-transitory computer-readable medium communicatively coupled to the processor. The processor can execute a client application embodied in the non-transitory computer-readable medium to perform operations. The operations include initiating control of at least one computing resource of the system. The computing resource is configured for executing at least one command in response to at least one input received via the input device. The operations also include configuring the computing resource such that the processor is restricted to accessing at least one resource managed by a management application. The client application can configure the computing resource in response to receiving a command from the management application.

These illustrative aspects and embodiments are not mentioned for purposes of limitation or definition, but to provide examples to aid understanding of the concepts described and disclosed herein. Other aspects, advantages, and features will become apparent after review of the entire disclosure, including the accompanying figures and claims.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
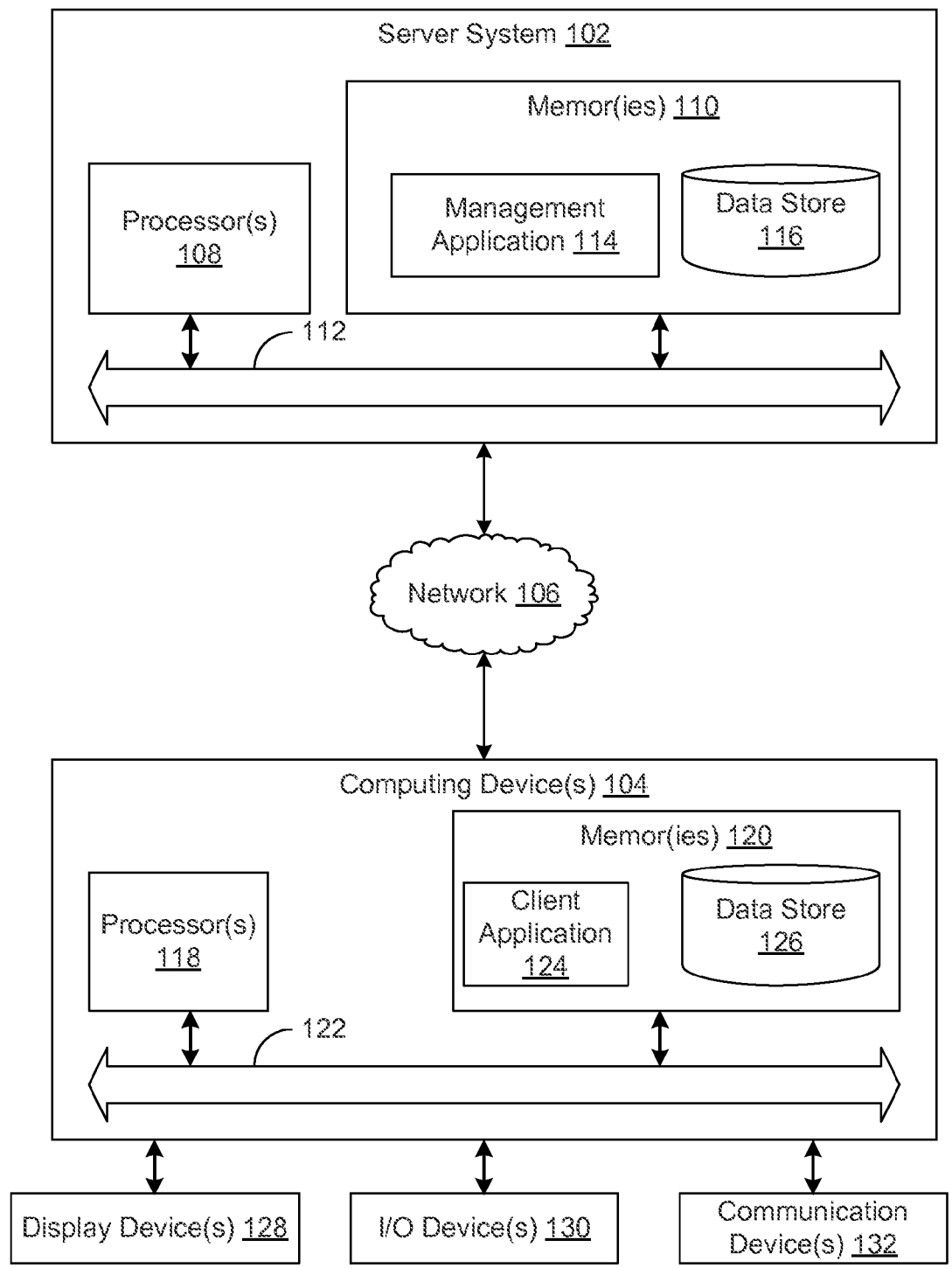
FIG. 1 is a block diagram of a networked environment according to some embodiments.

Computer-implemented systems and methods are disclosed for a management application controlling applications, files, and other resources being accessed, executed, or otherwise used at computing devices.

The following non-limiting example is provided to help introduce the general subject matter of some embodiments. A college professor may present a lecture to a group of students having tablet computers that can access a network. As a prerequisite for the professor's course, each student may be required to register his or her tablet computer with a mobile device management system. Registering a tablet computer with the mobile device management system can include installing a client application on the tablet computer that can communicate with a management application of the mobile device management system. The client application can take control of at least one resource of the tablet computer in response to commands from the management application. The mobile device management system can include a management application that can remotely control of at least one function of each tablet computer. The college professor can execute and/or otherwise access the management application via a control device, such as a desktop computer or other suitable computing device. The management application may provide a graphical interface at the control device. The graphical interface may include, for example, a listing of student computing devices corresponding to enrolled students, a listing of computing devices available for management that are discovered by the control device via near-field communication, a listing of resources stored at or accessible by the control device that can be distributed to or otherwise shared with client devices, and the like. The professor can request that the mobile device management system take control of the tablet computers. The mobile device management system can take control of the tablet computers by causing each tablet computer to access course material provided over the network, such as a presentation accompanying the professor's lecture. The mobile device management system can prevent each tablet computer from performing other functions during the professor's lecture, such as browsing the internet or sending e-mails. In one non-limiting example, a professor can scroll through images or other content on the control device, which configures each managed student device to scroll through the same images or other content. In another non-limiting example, a professor can identify default content to be displayed on the managed student devices in response to inputs received by the control device, such as an evacuation plan to be displayed at each managed student device in response to shaking the control device. The mobile device management system can thereby allow the professor to control the experience provided by each tablet computer registered with the mobile device management system.

In accordance with some embodiments, a management application determines that multiple computing devices are available for management via the management application. In some embodiments, the management application can be provided by a mobile device management system executed on a server system. The management application determines that each of the computing devices is executing a respective instance of a client application, such as a client component of a mobile device management system. The client application can communicate with the management application and control at least one computing resource of each computing device. The management application configures the computing resource of each computing device such that the computing device is restricted to accessing at least one common resource. The computing device is configured via communication between the management application and the respective instance of the client application. For example, the client application may, in response to a command from the management application, direct a processor of the computing device to execute instructions for accessing a shared network resource, directing a display device of the computing device to render the shared resource, and disabling a touch screen and/or keyboard of the computing device to prevent a user from accessing content other than the shared resource, thereby restricting an operator of the computing device from accessing content other than the common resource.

As used herein, the term "computing resource" can include any functionality provided by hardware and/or software of a computing device or system. A computing resource may be controllable and/or configurable by an operator of the computing device and/or by an operating system of the computing device with or without external input to the computing device. Non-limiting examples of computing resources include processing cycles or other processor usage, memory allocation, operations of input devices, operations of output devices, operations of firmware of the computing device, functionality provided by an operating system of the computing device, functionality provided by an application programming interface of the computing device, functionality provided by applications executed at the computing device, and the like.

One example of a common resource controlled by or otherwise accessible by a management application is a file or a group of files. In some embodiments, the management application may require a computing device to access and/or download the file or a group of files. The management application may permit the computing device to freely browse within the file or group of files. In some embodiments, the management application may require a computing device to access the file or a group of files and prevent the computing device from independently browsing or otherwise using the files.

Another example of a common resource is an application or a group of applications. In some embodiments, the management application may require a computing device to execute the application or group of applications. The management application may permit the computing device to utilize the full functionality of the application. The management application may restrict the computing device to utilizing a subset of the functionality provided by the application or group of applications, or may disable local control of the application and allow only remote control of the application by the control device or some other remote device.

The computing devices available for management can be identified by any suitable process and/or criteria. In some embodiments, determining that the computing devices are available for management can include determining that the computing devices are positioned in a common geographical area, such as a group of mobile devices issued to customers in a store. The management application can determine that the computing devices are positioned in a common geographical area by communicating with a computing device or system configured for detecting the computing devices, such as (but not limited to) a sensor system, a global positioning system, a telecommunication system, etc. In some embodiments, determining that the computing devices are available for management can include determining that the devices and/or the operators of the devices are logically associated with one another in a directory service and/or determining that the operators of the devices have at least one common attribute, such as being scheduled for the same class, being booked on the same flight or the same row on a flight, and the like.

The foregoing illustrative examples are given to introduce the general subject matter discussed herein and are not intended to limit the scope of the disclosed concepts. The following sections describe various additional aspects and examples with reference to the drawings in which like numerals indicate like elements. The features discussed herein are not limited to any particular hardware architecture and/or configuration. A computing device can include any suitable arrangement of components that provide a result conditioned on at least one input. Suitable computing devices include multipurpose microprocessor-based computer systems accessing stored software that programs and/or configures the computing system from a general-purpose computing apparatus to a specialized computing apparatus implementing one or more aspects of the present subject matter. Any suitable programming, scripting, and/or other type of language and/or combinations of languages may be used to implement the teachings contained herein in software to be used in programming and/or configuring a computing device. Aspects and features from each embodiment disclosed can be combined with any other embodiment.

Referring now to the drawings, FIG. 1 is a block diagram depicting example computing systems for implementing some embodiments. The example computing systems include a server system 102 and at least one computing device 104 in communication via a network 106. A general discussion of the components of the server system 102 and the computing device 104 is provided below.

The server system 102 may include at least one server computer or any other system providing capabilities for managing access to resources and/or distributing resources to computing device(s) 104. In some embodiments, multiple server systems 102 may be employed that are configured in at least one server bank, computer banks, or other arrangements. For example, multiple server systems 102 may be configured to provide a cloud computing resource, a grid computing resource, and/or any other distributed computing arrangement. Such server systems 102 may be located in a single installation or may be distributed among many different geographic locations. For purposes of convenience, the server system 102 is referred to herein in the singular. Even though the server system 102 is referred to in the singular, it is understood that multiple server systems 102 may be employed in the arrangements as descried herein.

The computing device 104 can include any suitable computing device or system for communicating via the network 106 and executing at least one application. Non-limiting examples of a computing device 104 include a desktop computer, a laptop computer, a personal digital assistant, a cellular telephone, a set-top box, a music player, a web pad, a tablet computer system, a game console, and/or another device with like capability. The computing device 104 may be configured to execute various applications. For example, the computing device 104 may be configured to execute applications such as web browsing applications, email applications, instant messaging applications, and/or other applications capable of receiving and/or rendering resources 202 on a display 136 associated with the computing device 104.

The server system 102 includes a processor 108 and the computing device 104 includes a processor 118. Each of the processors 108, 118 may be a microprocessor, an application-specific integrated circuit ("ASIC"), a state machine, or other suitable processing device. The processors 108, 118 may be of electrical or of some other available construction. Each of the processors 108, 118 can include any number of computer processing devices, including one. Each of the processors 108, 118 can be communicatively coupled to a computer-readable medium, such as the memories 110, 120, respectively. Each of the processors 108, 118 can execute computer-executable program instructions and/or accesses information respectively stored in the memory 110 of the server system 102 and in the memory 120 of the computing device 104.

Each of the memories 110, 120 can include a computer-readable medium or other memory device. A computer-readable medium or other memory device can include both volatile and nonvolatile memory and data storage components. Volatile components are those that do not retain data values upon loss of power. Nonvolatile components include memory components that retain data upon a loss of power. A computer-readable medium may include (but is not limited to) an electronic, optical, magnetic, or other storage device capable of providing a processor with computer-readable instructions. Other examples comprise, but are not limited to, floppy disks accessed via an associated floppy disk drive, magnetic disk, magnetic tape or other magnetic storage, memory chip, read-only memory ("ROM"), random access memory ("RAM"), an ASIC, a configured processor, optical storage accessed via an optical medium drive, solid-state drives, USB flash drives, memory cards accessed via a memory card reader, magnetic tapes accessed via an appropriate tape drive, and/or other memory components, or a combination of any two or more of these memory components. RAM may include, for example, static random access memory ("SRAM"), dynamic random access memory ("DRAM"), or magnetic random access memory ("MRAM") and other such devices. ROM may comprise, for example, a programmable read-only memory ("PROM"), an erasable programmable read-only memory ("EPROM"), an electrically erasable programmable read-only memory ("EEPROM"), or other like memory device.

The processor 108 and the memory 110 of the server system 102 may be communicatively coupled to a local interface 112. The processor 118 and the memory 120 of the computing device 104 may be communicatively coupled to a local interface 122. A local interface can include, for example, a data bus with an accompanying address/control bus or other bus structure. One or more of the processors 108, 118 may represent multiple processing devices and one or more of the memories 110, 120 may represent multiple memory devices that operate in parallel processing circuits, respectively. In such a case, one or more of the local interfaces 112, 122 may include an appropriate network that facilitates communication between any two of the multiple processors or between any two of the multiple memory devices. The local interfaces 112, 122 may comprise additional systems designed to coordinate this communication, including, for example, performing load balancing.

The computing device 104 may also include a number of external or internal devices such as a mouse, a keyboard, a display, audio speakers, one or more microphones, or any other input or output devices 130. For example, the computing device 104 may include or be in data communication with a display device 128. A non-limiting example of a display device 128 is a computer monitor or computer screen, such as a touch screen. Although FIG. 1 depicts the display device 128 as a separate device coupled to the computing device 104, the display device 128 can be integrated into the computing device 104.

The computing device 104 can also include one or more communication device(s) 132. One of the communication components can include a wired network connectivity component such as, for example, an Ethernet network adapter, a modem, and/or the like. The computing device 104 may further include a wireless network connectivity interface, for example, a Peripheral Component Interconnect ("PCI") card, a Universal Serial Bus ("USB") interface, a Personal Computer Memory Card International Association ("PCM-CIA") card, Secure Digital Input-Output ("SDIO") card, NewCard, Cardbus, a modem, a wireless radio transceiver, a cellular radio, and/or the like. The computing device 104 may be operable to communicate via wired connection with the server system 102 with the aid of the wired network connectivity component. The computing device 104 may be further operable to communicate wirelessly with the server system 102 with the aid of the wireless network connectivity component.

Instructions stored in the memory 110 of the server system 102 and executable by its processor 108 can include a management application 114 and/or other applications. The management application 114 can include at least one function for controlling resources executed at computing devices such as computing device 104, as described in detail below. Certain data may be stored in a data store 116 of the memory 110 that is part of or otherwise accessible to the server system 102. The illustrated data store 116 may be representative of a multiple data stores, as can be appreciated. The data stored in the data store 116, for example, is associated with the operation of certain applications and/or functional entities described herein. The data store 116 may utilize strong encryption standards to protect the resources 202 from unauthorized access. For example, the data store 116 may utilize Advanced Encryption Standard ("AES-256"), or a similar strong encryption standard that may be utilized for server-side data storage.

Instructions stored in the memory 120 of the computing device 104 and executable by its processor 118 can include a client application 124 and/or other applications. An application capable of receiving and/or rendering resources on a display device 128 is generally referred to herein as a "client application" 124. Certain data may be stored in a data store 126 of the memory 120 that is part of or otherwise accessible to the computing device 104. The illustrated data store 126 may be representative of multiple data stores. The data stored in the data store 126 may be associated with the operation of certain applications and/or functional entities described herein.

As used herein, the term "computer-executable program instructions" is used to refer to a program file that is in a form that can ultimately be run by a processor. Examples of computer-executable program instructions may be, for example, a compiled program that can be translated into machine code in a format that can be loaded into a random access portion of a memory and executed by a processor, source code that may be expressed in proper format such as object code that can be loaded into a random access portion of a memory and executed by a processor, source code that may be interpreted by another executable program to generate instructions in a random access portion of a memory and executed by a processor, and the like. The instructions may comprise processor-specific instructions generated by a compiler and/or an interpreter from code written in any suitable computer-programming language, including, for example, C, C++, C#, Objective-C, PHP, Visual Basic, Java, Python, Perl, JavaScript, and ActionScript. An executable program may be stored in any portion or component of a memory device such as, for example, RAM, ROM, a hard drive, solid-state drive, USB flash drive, memory card, optical disc such as compact disc ("CD") or digital versatile disc ("DVD"), floppy disk, magnetic tape, or other memory components.

The network 106 facilitates communication between a server system 102 and at least one computing device 104. The network 106 can include any suitable architecture for providing communication channels between the computing device 104 and the server system 102. A communication channel can include any suitable means capable of communicating signals between the computing device 104 and a server system 102. Non-limiting examples of the network 106 include any type of wired network, wireless network, or a combination of wired and wireless networks. A wireless network may be a wireless local area network ("WLAN"), a wireless wide area network ("WWAN"), or any other type of wireless network now known or later developed. Additionally, the network 106 may be or include the Internet, intranets, extranets, microwave networks, satellite communications, cellular systems, personal communication services ("PCS"), infrared communications, global area networks, or other suitable networks, etc., or any combination of two or more such networks.

Figure 2:
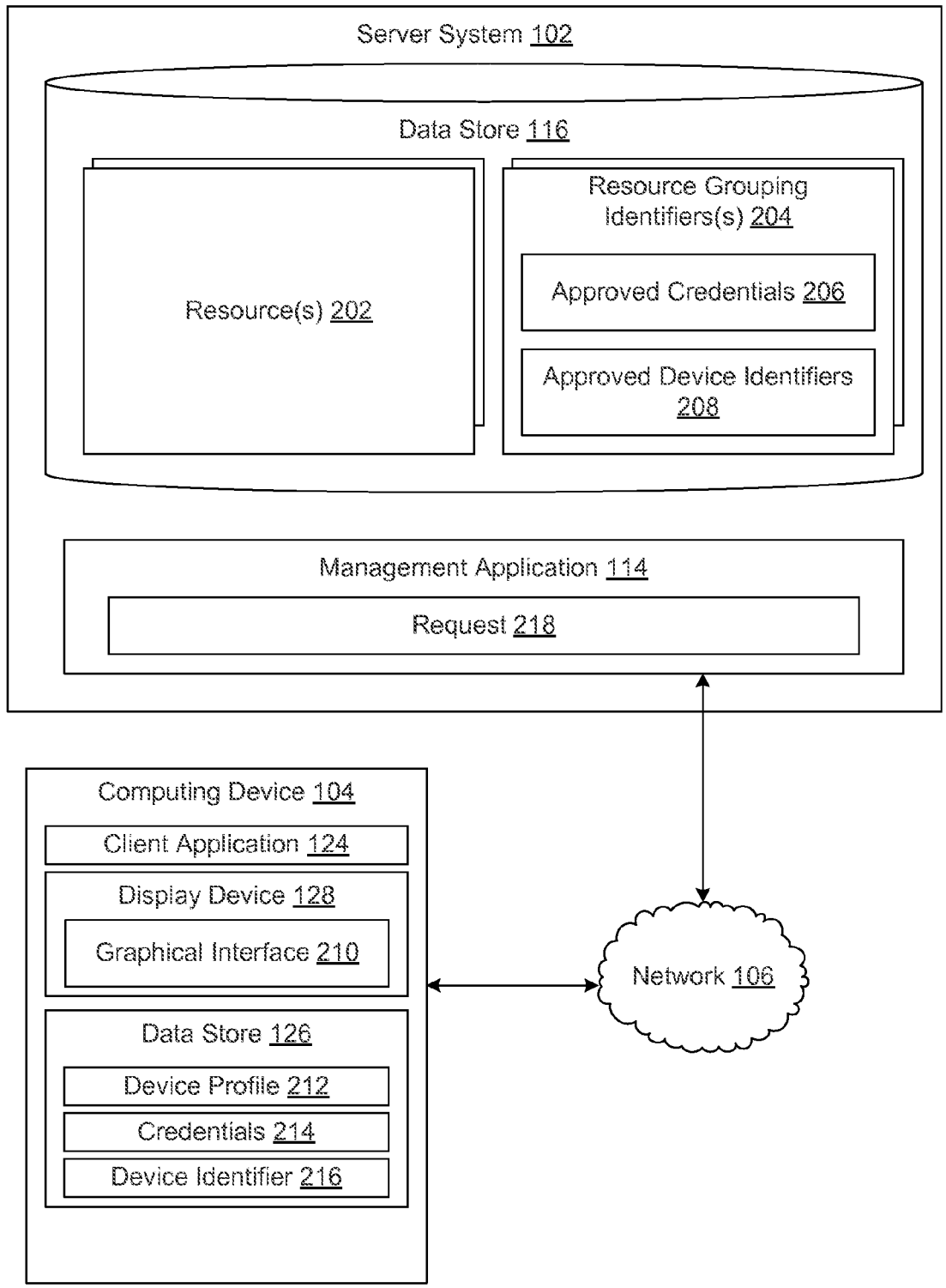
FIG. 2 is a modeling diagram depicting resources accessed by a client application and a management application for authorizing the use of resources by a computing device, according to some embodiments.

FIG. 2 is a modeling diagram depicting resources accessed by the client application 124 and/or the management application 114 for authorizing the use of resources 202 by the computing device 104, according to some embodiments.

The client application 124 may access resources from its associated data store 126 such as a device profile 212, at least one of the credentials 214, a device identifier 216, and other data. In some embodiments, the device profile 212 may include hardware, software, and security attributes that describe or otherwise identify the computing device 104. For instance, the device profile 212 may represent hardware specifications of the computing device 104, version and configuration information of various software programs and hardware components installed on the computing device 104, transport protocols enabled on the computing device 104, version and usage information of various other resources stored on the computing device 104, and/or any other attributes associated with the state of the computing device 104. Additionally, the device profile 212 may include data indicating a date of a last virus scan of the computing device 104, a date of a last access by an administrator entity, a date of a last access by the server system 102, a date of a last service by an administrator entity, and/or any other data indicating a date of last maintenance.

The credentials 214 may uniquely identify the user or other entity authorized to operate the computing device 104. For example, the credentials 214 may include a username, a password, a two-factor authentication token, and/or biometric data related to facial recognition, retina recognition, fingerprint recognition, and the like.

The device identifier 216 may uniquely identify the computing device 104. The device identifier 216 may include a software identifier, a hardware identifier, and/or a combination of software and hardware identifiers. For example, the device identifier 216 may be a unique hardware identifier such as a Globally Unique Identifier ("GUID"), Universally Unique Identifier ("UUID"), Unique Device Identifier ("UDID"), serial number, Internationally Mobile Equipment Identity ("IMEI"), Wi-Fi Media Access Control ("MAC") address, Bluetooth MAC address, a processing device identifier, and/or the like, or any combination of two or more such hardware identifiers. The device identifier 216 may additionally or alternatively be represented by a unique software identifier such a token or certificate, based at least in part on the aforementioned unique hardware identifiers.

The client application 124 may be executed to transmit requests to access resources 202 stored at or accessible via the server system 102. In some embodiments, the client application 124 may be a secure container program that may be authorized to receive and render selected resources 202, as described herein. In some embodiments, the client application 124 may be a browser configured to be executed as described herein.

The client application 124 may access the resources 202 via a graphical interface 210 or other suitable interface rendered on the display device 128. The resources 202 may be presented in a graphical interface 210 by decompressing compressed files and presenting the uncompressed files, by mounting disk image files and presenting the mounted image files, by running executable files and presenting the executed files, by enabling a data search of the resources 202 and presenting the featured output in a user interface, by calling on another application on the computing device 104 to respond to data links contained within the resources 202, and/or by transmitting a part or the whole of the resources 202 to another application on the computing device 104.

In some embodiments, a client application 124 may be executed to present a single resource 202 and/or a series of resources 202 in a comprehensive manner. A non-limiting example of presenting a series of resources 202 in a comprehensive manner is presenting photograph files in a slideshow presentation. In some embodiments, the client application 124 may be executed to render an environment that presents multiple resources 202 in a single view, such as a category-based tree or outline format, based at least in part on a resource qualifier associated with the resources 202.

The client application 124 may also facilitate the modification of resources 202 provided by the management application 114 and the modification of data associated with the provided resources 202. For example, the client application 124 may include functionality for adding content to the existing resources 202, removing content from the existing resources 202, altering the content of existing resources 202, and/or the like, or any combination of manipulations of the resources 202.

The client application 124 may further be executed to add new resources 202 to be hosted by the server system 102. For example, a user having administrator-level credentials 214 may interact with an I/O device 130 to manipulate the graphical interface 210 and thereby generate instructions to transfer copies of resources 202 locally stored on the computing device 104 to the server system 102 to be included in the data store 116. In some embodiments, the user of the computing device 104 may initiate upload of at least one of the resources 202 via the graphical interface 210 rendered by the client application 124, as can be appreciated. In addition, the user may indicate approved resource grouping identifiers for identifying groups of entities or devices that are permitted to access the uploaded resource 202 and specify distribution rules that are required to be complied with in order to access the uploaded resource 202, as will be described. In some embodiments, a user without administrator-level credentials 214 may manipulate the graphical interface 210 to transfer local copies of personal resources 202 to the server system 102. In this example, resources qualifiers associated with the personal resources 202 may be configured by default to restrict access by any other user.

Additionally, the client application 124 may also be configured to optionally restrict access to the resources 202 by other applications executed by the computing device 104, thereby preventing access to the resources 202 from an application other than the client application 124. In some embodiments, the client application 124 may monitor network traffic between the computing device 104 and the server system 102 and identify any data being transmitted between an application executed by the computing device 104 other than the client application 124 and the server system 102. The client application 124 may determine whether a resource 202 is being provided to an application other than the client application 124 executed by the computing device 104 and intercept and/or block the incoming resource 202. In some embodiments, the client application 124 may allow the intercepted resource 202 to be accessible to the user via a graphical interface 210 rendered by the client application 124. In some embodiments, the client application 124 may deny access to the intercepted resource 202 by any other application on the computing device 104. Additionally, the client application 124 may be executed to call on other services associated with the resources 202 that are executed on the server system 102 or another server or device accessible to the client application 124, for instance, a technical support service that may be executed on the server system 102.

Certain applications and/or other functionality may be executed in the server system 102 according to some embodiments. The components executed on the server system 102, for example, include the management application 114 and other applications, services, processes, systems, engines, or functionality not disclosed in detail herein. The management application 114 is executed to provide resources 202 stored in the data store 116 and/or provide access to resources accessible by the server system 102. In addition, the management application 114 may also accept new resources 202 provided by the user of the computing device 104, and previously provided resources 202 modified by the user of the computing device 104, as will be described.

The data store 116 may include resource grouping identifiers 204, resources 202, and/or other data. The resource grouping identifiers 204 may represent unique identifiers for previously determined resource groupings and are used to determine which resources 202 are served up to the user of the computing device 104, as will be described. For example, a resource grouping may relate to organizational groups, organizational roles, geographic locations, and/or any other type(s) of grouping(s) that require access to a type of resource. Each resource grouping identifier may be associated with a pairing of at least one of a plurality of approved credentials 206 and at least one of a plurality of approved device identifiers 208. In some embodiments, each combination of approved credentials 206 and approved device identifiers 208 may be associated with more than one of the resource grouping identifiers 204. Additionally, the pairing of approved credentials 206 and approved device identifiers 208 may be associated with a user's organizational role and/or capacity. For instance, the pairing of approved credentials 206 and the approved device identifiers 208 may be predetermined by a technical services administrator or other administrative entity. In some embodiments, the pairing of approved credentials 206 and the approved device identifiers 208 may be automatically associated with the resource grouping identifiers 204 based at least upon a user's pay grade, organizational level, status within the organization, and/or any other organizational factor.

Each resource may be associated with a listing of approved resource grouping identifiers 204 and at least one distribution rule. In some embodiments, the listing of approved resource grouping identifiers 204 includes resource grouping identifiers 204 that regulate access to the respective resource. In some embodiments, the listing of approved resource grouping identifiers 204 may be predetermined by an administrator entity. For instance, the administrator entity may specify which resource grouping identifiers 204 are permitted access to the respective resource 202. Additionally or alternatively, distribution rules may regulate how an entity having a combination of the appropriate credentials 214 and device identifier 216 may access the respective resource 202. For example, in some embodiments, the distribution rules may describe a required and/or a permitted state that an accessing computing device 104 may satisfy in order for the computing device 104 to be permitted access to the resource 202. Non-limiting examples of distribution rules may include (but are not) limited to hardware requirements, software requirements, configuration requirements, maintenance requirements of a computing device, and/or requirements related to the resource 202.

In some embodiments, hardware requirements may include requirements associated with a processor of the computing device 104, memory, power supply, external storage, peripherals, and/or the like. Software requirements may include requirements associated with the operating system type and version, operating system authenticity and jailbreak/rooted status, installed application types and versions, and/or the like. Configuration requirements may include requirements associated with the configuration of the hardware, software, data encryption methods, transport protocols, and/or the like. Maintenance requirements may include requirements associated with the date of last virus scan for the computing device 104, the date of the last access of the computing device 104 by an administrative entity, the date of last communication between the computing device 104 and the server system 102, the date of last tune-up of the computing device 104, and/or the like. Requirements related to the resource 202 may include whether the resources 202 may be rendered while the computing device 104 is offline and/or not in communication with the management application 114, whether to permit synchronization of the resources 202 with a remote data store, whether to restrict the resources 202 from being forwarded, whether to permit storing resources 202 locally on the computing device 104, and/or the like. Alternatively, the resources 202 and distribution rules may be stored on another data store accessible to the computing device 104 and/or other storage facility in data communication with the server system 102, such as an internal email server, a web-based email server, an internal file server, a third-party hosted file server, a cloud-based server, or a cached local data store on the computing device 104.

A user or other entity operating a computing device 104 may wish to access resources 202 stored on the server system 102. In some embodiments, the user may manipulate a graphical interface 210 rendered by the client application 124 to transmit a request 218 for accessing at least one of the resources 202 on the server system 102. For instance, the user may provide credentials 214, such as, a unique user name, a password, biometric data, and/or other types of credentials 214 to request access to the server system 102. The client application 124 may transmit the request 218 to the management application 114. In some embodiments, the request 218 may include the credentials 214 provided by the user, the device identifier 216 that uniquely identifies the computing device 104, and/or any other relevant information.

The management application 114 or another service provided by the server system 102 receives the request 218 and determines whether the user is authorized to access the resources 202 from the computing device 104. For example, the management application 114 may determine that the user is authorized to access the resources 202 from the computing device 104 based on the credentials 214 and the device identifier 216 provided with the request 218.

Upon determining that the user is authorized to access the resources 202 from the computing device 104, the server system 102 determines which of the resources 202 to provide to the computing device 104. In some embodiments, the management application 114 determines which resources 202 to provide based on resource grouping identifiers 204 associated with each resource 202. For instance, the management application 114 may determine which resource grouping identifiers 204 are associated with the pairing of credentials 214 and the device identifier 216 included in the request 218. In some embodiments, the management application 114 parses the listing of approved credentials 206 and the listing of approved device identifiers 208 of each resource grouping identifier to determine whether the respective resource grouping identifier is associated with both the credentials 214 and the device identifier 216. The management application 114 may identify a resource 202 to provide to the computing device 104 based on the determined resource grouping identifiers 204. In some embodiments, the management application 114 identifies at least one of the resources 202 associated with each one of the determined resource grouping identifiers 204. In some embodiments, the management application 114 identifies a resource 202 that is associated with the determined resource grouping identifiers 204. In some embodiments, the management application 114 identifies the resource 202 if it is associated with a threshold number of the resource grouping identifiers 204. The management application 114 may provide the identified resources 202 to the user of the computing device 104.

In some embodiments, the management application 114 may additionally determine whether the computing device 104 from which the user requested access to the resources 202 complies with the distribution rules associated with each one of the identified resources 202. For example, the management application 114 may determine whether the device profile 212 describing the state of the computing device 104 complies with the distribution rules of each identified resource 202. As discussed above, the device profile 212 may include hardware specifications of the computing device 104, software specifications of the computing device 104, version information of various other components of the computing device 104, and/or any other information profiling the computing device 104. In some embodiments, the management application 114 may provide each identified resource 202 to the user if the computing device 104 complies with all of, or at least a portion of, the distribution rules associated with each of the identified resources 202. In some embodiments, the management application 114 may provide the identified resource(s) 165 to the user if the computing device 104 complies with at least a threshold number of the distribution rules associated with each of the identified resources 202.

Responsive to a determination that the computing device 104 is in a state of compliance with the distribution rules, the management application 114 may be further executed to transmit the identified resources 202 to the computing device 104. In some embodiments, the management application 114 may automatically transmit the identified resources 202 to the computing device 104. In some embodiments, the management application 114 may make the identified resources 202 available for download by the computing device 104 based on a resource qualifier associated with the respective resource 202. For instance, the resource qualifier may indicate the respective resource 202 be made available for download to the computing device 104. In this example, the user may transmit a request to the management application 114 to download the respective resource 202.

In some embodiments, the state of the computing device 104 may have been modified between the time the management application 114 makes the identified resource 202 available for download and the time the management application 114 receives the request to download the identified resource 202. For example, the computing device 104 may have switched connectivity from a secured network 106 to an unsecured network 106. In this embodiment, the management application 114 may determine for a second time whether the computing device 104 complies with the distribution rules. For example, the request to download transmitted from the computing device 104 may include an updated device profile 212. The management application 114 may make the second determination of whether the computing device 104 complies with the distribution rules based on the updated device profile 212. For instance, the distribution rules may require that the computing device 104 be connected to a secured network 106 to gain access to the resource and the second determination of compliance may reveal that the computing device 104 is connected to an unsecured network 106. Responsive to the second determination that the computing device 104 complies with the distribution rules, the management application 114 provides the requested resource 202. In some embodiments, the device profile 212 may be periodically transmitted by the client application 124 to the server system 102. In this embodiment, each time the device profile is transmitted to the server system 102, the management application 114 may determine whether the updated computing device 104 complies with the distribution rules using the updated device profile 212.

In some embodiments, the management application 114 may transmit distribution rules associated with each one of the identified resources 202 to the computing device 104. For example, the management application 114 may transmit the distribution rules to the client application 124 for determining whether the computing device 104 complies with the distribution rules. In some embodiments, the management application 114 may not determine whether the computing device 104 complies with the distribution rules of each of the identified resources 202 and instead permits the client application 124 to make this determination. For instance, the client application 124 may determine whether the computing device 104 complies with the distribution rules associated with the received resource 202 prior to rendering the received resource 202 on the display device 128.

In some embodiments, the management application 114 may transmit the distribution rules to the computing device 104 prior to transmitting the identified resources 202. The client application 124 may determine whether the computing device 104 complies with the distribution rules, as described above. The client application 124 may transmit an indication back to the management application 114 of the compliance status. Responsive to receiving an indication from the computing device 104 that the computing device 104 complies with all and/or a sufficient portion of the distribution rules associated with each respective resource 202, the management application 114 may transmit the appropriate identified resources 202 to the computing device 104. Additionally, the client application 124 may store the distribution rules in a memory associated with the computing device 104, such as the data store 126. Upon subsequent requests to access the identified resource 202, the management application 114 may wait to receive an indication from the client application 124 that the computing device 104 complies with the distribution rules associated with the requested resource 202 to determine whether to transmit the requested resource 202. For example, the client application 124 may use the stored distribution rules received from a previous request to make the determination and transmit the request.

The management application 114 may be further executed to log activity related to the resources 202 for asset tracking purposes. For example, the management application 114 may log activities such as transmission of resources, historical data related to the transmission of the resource, data related to the rendering of the resources 202 by the computing device 104, data related to a storage location of the resources 202, data related to communication with the computing device 104, data related to resource qualifiers associated with the resources 202, data related to computing device 104 compliance with distribution rules, data related to usage and availability of bandwidth, and/or any other data related to the resources 202.

In some embodiments, the management application 114 may periodically determine whether the transmitted resources 202 have been modified on the computing device 104 and synchronize the modified resource 202 on the computing device 104 with the unmodified resource 202 on the server system 102. For instance, the management application 114 may determine whether the resource 202 has been modified based on an edit date, modified date, and/or an access date associated with the resource 202. In this embodiment, the management application 114 may periodically request to receive the relevant date from the client application 124. Upon receiving the relevant date, the management application 114 compares the relevant date from the computing device 104 with the corresponding date on the server system 102 and determines to synchronize the respective resources 202 if the two relevant dates do not match. For instance, the management application 114 may employ a synchronization approach as is known in the art. In some embodiments, the management application 114 may employ the synchronization approach based on determining whether the user is permitted to modify the resource 202 on the computing device 104. In some embodiments, the management application 114 may remove the resource 202 on the computing device 104 upon synchronizing with the server system 102. In some embodiments, the management application 114 stores the modified resource 202 in the data store 116 as one of a plurality of versions of the respective resource 202.

In some embodiments, the client application 124 may be pre-authorized to access at least some of the resources 202 hosted by the distribution server. In such embodiments, the management application 114 may be configured to provide to the client application 124 a listing of resources 202 available for download by the computing device 104 based only on certain embedded authorization data (e.g., device identifier 216, and/or device profile 212, etc.) and without requiring the client application 124 to provide additional authorization data (e.g., user name and password). For example, the management application 114 may identify resources 202 to include in the listing by determining which of the resources 202 are associated with distribution rules that correspond with the device profile 212 of the computing device 104. The management application 114 may allow the client application 124 to download at least some of the available resources 202. At least one of the available resources 202 may be associated with a distribution rule that requires additional authorization. For instance, the resource 202 may be a document containing sensitive information that requires authorization of a username and password or other additional authorization data. Thus, if the client application 124 submits a request to download such a resource 202, the management application 114 may prompt the client side application to provide additional authorization data. In response, the client application 124 may prompt the user to provide credentials 214. In some embodiments, the client application 124 may transmit the credentials 214 and/or the device identifier 216 of the computing device 104 to the management application 114. The management application 114 may authorize the user to access the sensitive resource 202 using any suitable authorization approach. Upon determining that the user is authorized to access the sensitive resource 202 from the computing device 104, the management application 114 may allow the client application 124 to download the sensitive resource 202.

Although the management application 114, client application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Figure 3:
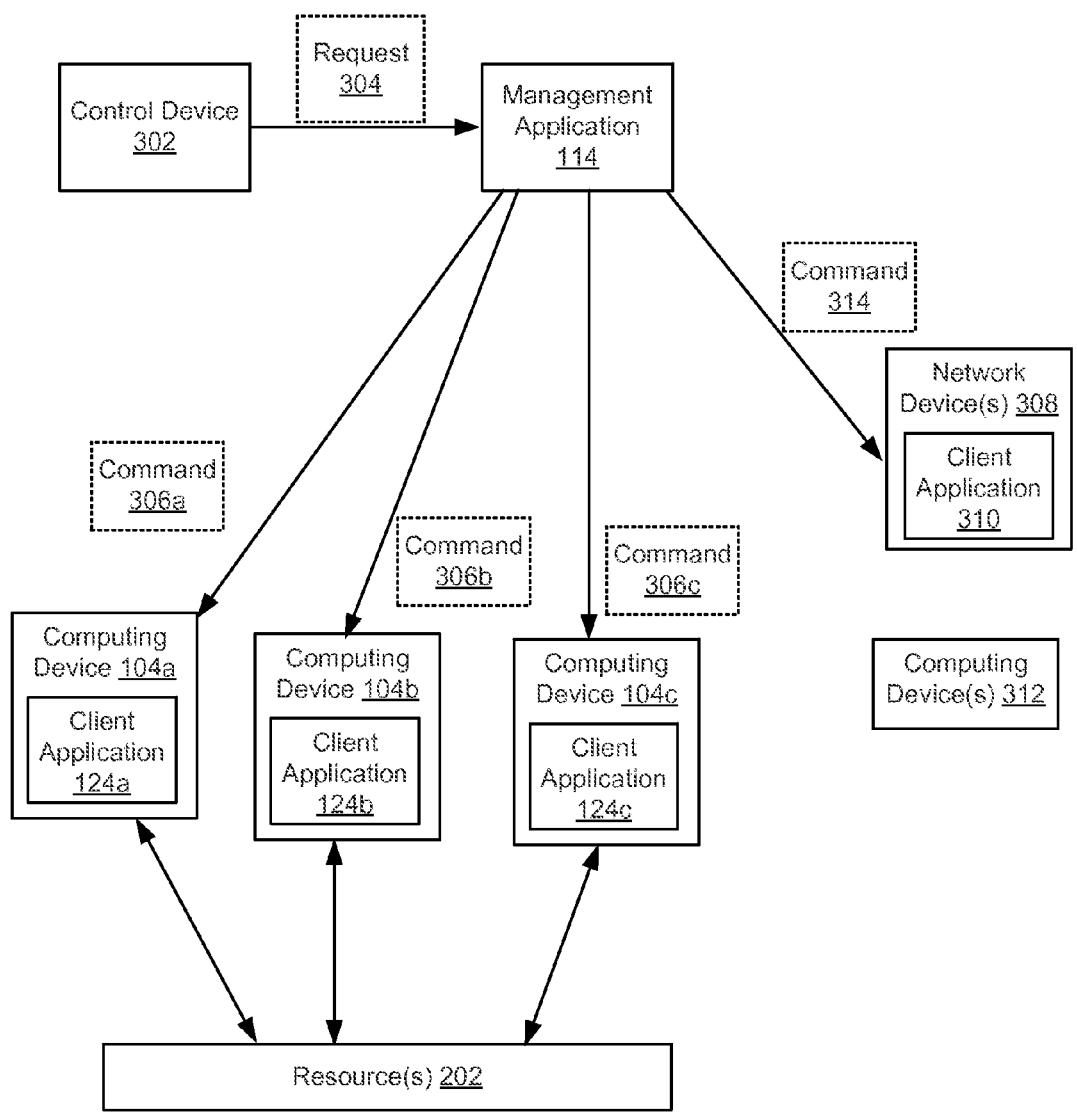
FIG. 3 is a modeling diagram depicting an example flow of communications among a management application accessed by a control device and multiple computing devices, according to some embodiments.

FIG. 3 is a modeling diagram depicting an example flow of communications among a management application 114 accessed by a control device 302 and multiple computing devices 104a-c, according to some embodiments.

A control device 302 can include any suitable device configured for accessing the server system 102. Non-limiting examples of a control device 302 include a desktop computer, a laptop computer, a tablet computer, a single function handset with one or more buttons, a touch screen device, and the like. In some embodiments, a control device 302 can include a processor, memory, display device, at least one I/O device, and/or at least one communication device such as (but not limited to) the processor 118, memory 120, display device 128, I/O device 130, and/or communication device 132 described above with respect to FIG. 1.

The control device 302 can be operated by a user or other entity assigned to control which of the resources 202 each of the computing devices 104a-c can access or otherwise use and the manner of access of use of the resources 202 by the computing devices 104a-c. For example, a college professor may access a control device 302 (such as a desktop computer communicatively coupled to the network 106) to control computing devices 104a-c (such as tablet computers) operated by students in the professor's classroom.

The control device 302 may or may not be enrolled in a management system that includes that management application 114.

In some embodiments, the control device 302 can access the management application 114 via communication between a control application executing at the control device 302 and the management application 114. The control application may be a secure container program that may be authorized to communicate with the management application 114. In some embodiments, the control device 302 can access the management application 114 via a browser configured to be executed as described herein. The control device 302 may access the management application 114 and/or the server system 102 via any suitable communication protocol, including (but not limited to) radio communication protocols and/or communication protocols used in a data network.

In some embodiments, the control device 302 and/or at least one user of the control device 302 may be enrolled with the management application 114 as a member of a control group. The computing devices 104a-c and/or users of the computing devices 104a-c may be enrolled as members of a client group. Members of the control group may be granted additional permissions with respect to available resources as compared to members of the client group. For example, control group members may have permission to modify resources 202 on server system 102. Client group members may have permission to view resources 202 and lack permission to modify the resources 202.

In some embodiments, the control device 302 can execute the management application 114 and/or an instance of the management application 114 instead of or in conjunction with the server system 102. In some embodiments, the control device 302 can distribute and/or otherwise provide access to at least one of the resources 202 without the computing devices 104a-c accessing the server system 102. For example, at least one of the resources 202 may be stored in a memory of the control device 302 and/or accessed from the server system 102 by the control device 302 for provision to at least one of the computing devices 104a-c by the control device 302.

The control device 302 can transmit a request 304 to the management application 114 requesting that the management application 114 assume control of the computing devices 104a-c. The control device 302 can transmit the request 304 via the network 106 to the server system 102 executing the management application 114. The request 304 (or subsequent communications) can include information for identifying the computing devices 104a-c. The request 304 (or subsequent communications) can also include information for identifying which of the resources 202 is to be accessed by the computing devices 104a-c and how the accessed resource 202 is to be used by the computing devices 104a-c. Details regarding the identification of computing devices 104a-c and controlling the use of an accessed resource 202 are provided below with respect to FIG. 4.

The management application 114 can respond to the request 304 and other or communications by respectively transmitting, broadcasting, or otherwise communicating the commands 306a-c to the client applications 124a-c executed on the computing devices 104a-c. Prior to the communication of the commands 306a-c, the computing devices 104a-c can operate independently of the management application 114 and of one another.

In some embodiments, a server system 102 executing the management application 114 can communicate the commands 306a-c to the client applications 124a-c. In some embodiments, a control device 302 executing the management application 114 can communicate the commands 306a-c to the client applications 124a-c via at least one near field communication ("NFC") process. Non-limiting examples of NFC processes include touching each of the computing devices 104a-c to the control device 302 or another sensor device and/or bringing each of the computing devices 104a-c into close proximity with the control device 302 or another sensor device. In some embodiments, a control device 302 or other device executing the management application 114 can communicate the commands 306a-c to the client applications 124a-c via a Wi-Fi network, a Bluetooth network (such as, but not limited to, Bluetooth 4.0), and/or any suitable personal area network and/or wireless network.

In some embodiments, the management application 114 can search for a beacon or other identification signal broadcasted or otherwise transmitted by each of the computing devices 104a-c. The beacon or other identification signal can identify the computing device as being available for management. The management application 114 can search for the beacon at predetermined times or time periods or continuously search for the beacon during the sharing of the resources 202. In some embodiments, the management application 114 can broadcast a discovery signal. The discovery signal can be received by the computing devices 104a-c at which the client applications 124a-c are respectively executing. Each of the client applications 124a-c can transmit a response to the discovery signal. The response can notify the management application 114 that the computing devices 104a-c are available for management. At least one of the client applications 124a-c may automatically transmit a response to the management application 114 without intervention by respective operators of the computing devices 104a-c. Additionally or alternatively, at least one of the client applications 124a-c may provide a prompt to the respective operator and transmit a response to the management application 114 based on the respective operator affirming that the management application 114 is permitted to take control of the computing device.

In a non-limiting example, the management application 114 may execute a link layer discovery protocol ("LLDP") and/or other suitable protocols for identifying computing devices within a proximity to a computing device executing the management application 114. The management application 114 can retrieve and/or otherwise obtain a list of clients (such as the computing devices 104a-c and/or users of the computing devices 104a-c) assigned to a particular group. The management application 114 can identify a list of approved clients. The management application 114 can detect each client establishing contact with the management application 114. The management application 114 can transmit a message to at least one of the clients requesting enrollment with the management application. Non-limiting examples of such messages include e-mail, text messages, etc.

In some embodiments, the management application 114 can establish a respective network session with each of the computing devices 104a-c over the network 106. In one non-limiting example, the management application may detect the computing devices 104a-c and determine that the computing devices 104a-c are available for management, as described below with respect to FIG. 4. The management application 114 may authenticate each of the detected computing devices 104a-c and/or the users or other entities accessing the computing devices 104a-c via the network sessions with the computing devices 104a-c. The management application 114 can communicate the commands 306a-c to the authenticated computing devices 104a-c.

In some embodiments, the management application 114 can transmit, broadcast, or otherwise communicate the commands 306a-c to the computing devices 104a-c without establishing a network session with at least one of the computing devices 104a-c and/or authenticating at least one of the computing devices 104a-c.

The commands 306-c can direct each of the client applications 124a-c to assume control of computing resource(s) of at least one of the computing devices 104a-c. Controlling the computing resources of the computing devices 104a-c can include, for example, requiring the display devices of the computing devices 104a-c to render data provided by the client applications 124a-c, deactivating or restricting the use of at least one I/O device of the computing devices 104a-c (e.g., keyboards, mice, etc.), and the like. In some embodiments, controlling a computing resource can include initiating, activating, or otherwise authorizing the use of at least one computing resource of at least one of the computing devices 104a-c. Non-limiting examples of initiating, activating, or otherwise authorizing the use of at least one computing resource of at least one of the computing devices 104a-c include initiating, activating, or otherwise authorizing the use of an input device such as a microphone, a Bluetooth radio configured for device pairing, a positioning system configured for locating control group members, and the like.

In some embodiments, controlling a computing resource can include terminating, de-activating, or otherwise restricting the use of at least one computing resource of at least one of the computing devices 104a-c. Non-limiting examples of terminating, de-activating, or otherwise restricting the use of at least one computing resource include accessing a device application programming interface ("API") to disable user access to at least one hardware component (such as, but not limited to, a camera, a keyboard, etc.), accessing a device API to disable user access to at least one software function provided via a user interface (such as, but not limited to, application switching, copy/paste, etc.), rerouting network traffic through a proxy that selectively permits and/or prevents access to available network resources, and the like.

The control device 302 and/or the management application 114 can configure least one computing resource of at least one of the computing devices 104a-c directly and/or via at least one of the client applications 124a-c. The client applications 124a-c can access, execute, or otherwise use at least one of the resources 202 identified by the commands 306-c, as described below with respect to FIG. 4. Controlling the resources of the computing devices 104a-c can involve the client applications 124a-c communicating with the respective operating systems of the computing devices 104a-c.

In some embodiments, at least one compliance and/or authorization process described above with respect to FIG. 2 can be performed prior to allowing at least one of the computing devices 104a-c to access the resources 202. In some embodiments, the computing devices 104a-c may access the resources 202 without some or all of the compliance and/or authorization processes described above with respect to FIG. 2 being performed. In a non-limiting example, authorization and/or compliance may or may not be needed in order for a management application 114 to take control of a computing device 104 based on a given resource being marked as publicly available and/or a given resource being configured with different and/or less restrictive policy requirements. In some embodiments, access to a resource may be granted in an order specified by the management application 114. For example, a resource may be inaccessible until other resources have been accessed according to a specific order provided by the management application 114.

In some embodiments, the control of the computing devices 104a-c can terminate in response to a termination condition specified in the commands 306-c. For example, the commands 306a-c can specify that the computing devices 104a-c are to access or otherwise use a specified resource 202 for a predefined time period. The computing devices 104a-c may resume independent operations after the time period has elapsed. In some embodiments, the control device 302 can transmit a second request to the management application 114 requesting that the computing devices 104a-c be released. In response to the release request, the management application can communicate additional commands to the client applications 124a-c directing the client applications 124a-c to return control of the computing devices 104a-c to the device operators.

In some embodiments, each of the computing devices 104a-c may be positioned in a geographical area in which network connectivity is provided by at least one network communication device that can be controlled by the management application. For example, as depicted in FIG. 3, at least one network device 308 may provide network connectivity to the computing devices 104a-c on which the client applications 124a-c are installed. A non-limiting example of a network device 308 is a router that can be controlled by the management application 114. In some embodiments, the management application 114 may communicate with the network device(s) 308 via a secure container program installed on the network device(s) 308, such as the client application 310 depicted in FIG. 3. In some embodiments, the management application 114 may communicate with the network device(s) 308 via another computing system configured to control the network device(s) 308, such as a server system providing network connectivity between the computing devices 104a-c and the server system 102.

The network device(s) 308 may also provide network connectivity to other computing device(s) 312 on which an instance of the client application 124 is not installed. For example, a computing device 312 may be a computing device that is not registered with a mobile device management system that includes the management application 114. The management application 114 may be unable to communicate commands to the computing device(s) 312 on which an instance of the client application 124 is not installed. The management application 114 may be able to restrict the operations of the computing device(s) 312 by communicating a command 314 to the network device(s) 308. The command 314 communicated to the network device(s) 308 can identify the computing device(s) 312 via any suitable identifier, such as an IP address or a MAC address. The command 314 can direct the network device(s) 308 to restrict or deny network access by the computing device(s) 312.

In some embodiments, the command 314 can specify that restriction of the computing device(s) 312 can terminate in response to a termination condition, such as a predefined time period. In some embodiments, the control device 302 can transmit a second request to the management application 114 requesting that the restriction of the computing device(s) 312 be terminated. In response to the release request, the management application can communicate additional commands to the network device(s) 308 directing that restrictions on network access by the computing device(s) 312 be removed.

In some embodiments, the management application 114 may restrict the access of computing devices have an instance of a client application 124 installed in the same manner as described above with respect to computing device(s) 312. For example, the management application 114 may restrict the access of computing devices that are not authenticated or fail a compliance test, as determined by a network session established between an instance of the client application 124 and the management application 114.

Figure 4:
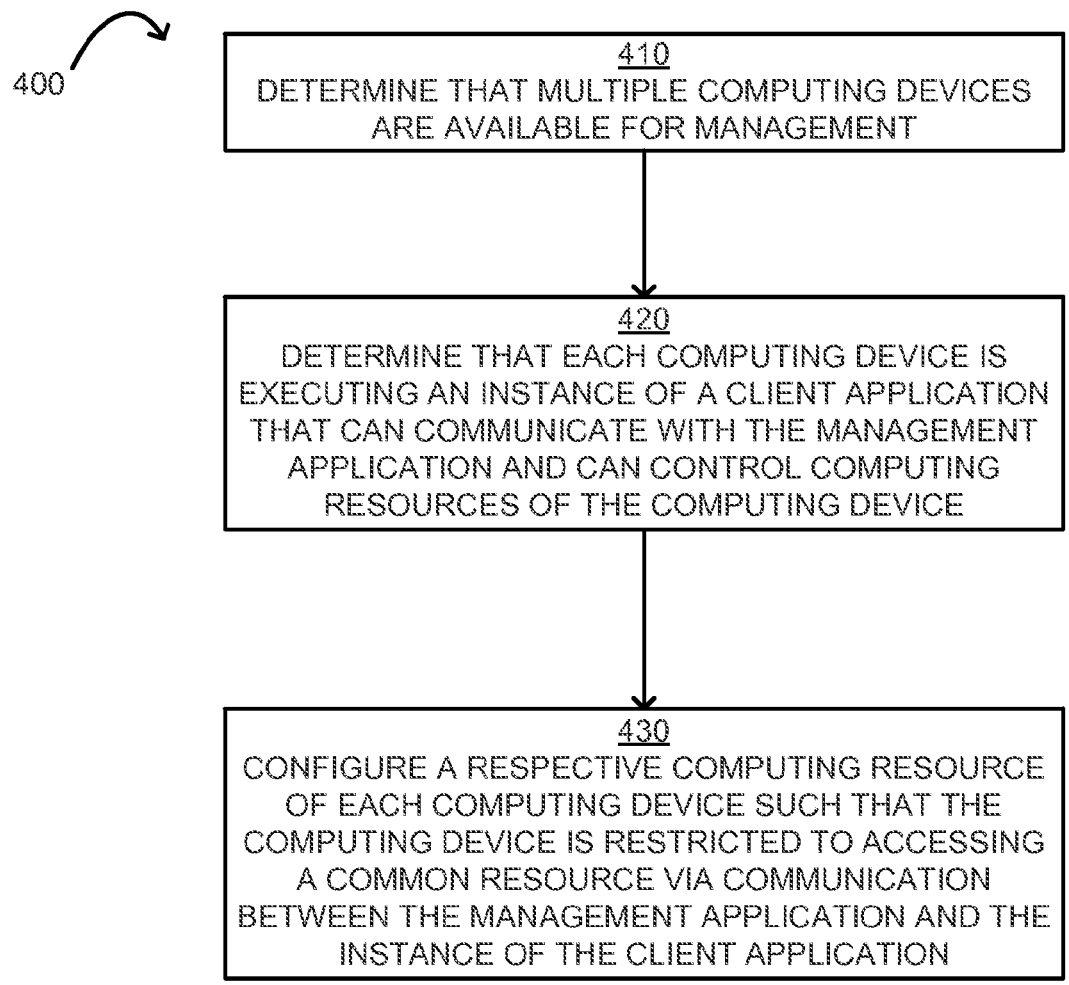
FIG. 4 is a flow chart illustrating an example method for controlling resources being used at computing devices according to some embodiments.

FIG. 4 is a flow chart illustrating an example method 400 for controlling resources 202 being used at computing devices 104a-c. For illustrative purposes, the method 400 is described with reference to the system implementations depicted in FIGS. 1-2 and the flow of communication depicted in FIG. 3. Other implementations, however, are possible.

The method 400 involves identifying multiple computing devices, as shown in block 410. For example, the processor 108 of the server system 102 can execute the management application 114 to identify the computing devices 104a-c.

In some embodiments, identifying the computing devices can include determining that each computing device is registered with a directory service and that each computing device is grouped in a common organizational unit of the directory service. A directory service can include a software system that provides a logical organization for network administration and/or security. A non-limiting example of a directory service is Microsoft® Active Directory™. The directory service can include domain controllers or other server systems that can authenticate and authorize entities accessing a network, such as the network 106. The directory service can manage organizational units such as users, groups, and other entities via a logical structure such as a hierarchy. For example, each of the computing devices 104a-c and/or users accessing the computing devices 104a-c may be associated with a common organizational unit in a directory service, such as (but not limited to) computing devices associated with technical support personnel in an organization.

In some embodiments, identifying the computing devices can include identifying at least one attribute common to each of the entities associated with the computing devices 104a-c. Entities associated with the computing devices 104a-c may be user credentials authorized to access the computing devices 104a-c. For example, the management application 114 may access a file in a data store 116 that identifies multiple entities, such as airline passengers or college students. The management application 114 may determine that a group of entities shares at least one common attribute, such as a group of airline passengers scheduled for the same flight or a group of college students scheduled for the same course. The management application 114 may identify the computing devices by accessing a listing of registered computing devices 104a-c associated with the entities sharing the common attribute. In one non-limiting example, each passenger in a listing of passengers scheduled for a common airline flight may be associated with a respective smart phone, tablet computer, or other computing device registered to the passenger. In another non-limiting example, each of a group of students scheduled for the same course may be associated with a respective smart phone, tablet computer, or other computing device registered to the student.

In some embodiments, identifying the computing devices can include determining that the computing devices are positioned in a common geographic location. The management application 114 may identify the common geographical location by reference to a file or other data stored in a data store 116. The common geographical location can be defined in any suitable manner. In some embodiments, a common geographical location may be delineated by fixed boundaries. In some embodiments, a common geographical location may be defined by a proximity to at least one reference location, such as (but not limited to) a distance from at least one base station in a telecommunication system and/or access point in a wireless data network.

The management application can determine that the computing devices 104a-c are positioned in a common geographic location via any suitable process. In some embodiments, the management application 114 can detect or otherwise determine that each computing device is registered with the management application via a sensing device positioned in the common geographic location. In one non-limiting example, at least one radio-frequency identification ("RFID") scanner may be positioned at a respective location in a geographic location. Each of the computing devices 104a-c may display an RFID identifier or have an RFID identifier affixed to the computing device. The RFID identifier can be scanned by an RFID scanner. Data from the RFID scanner identifying the scanned computing devices can be communicated to the management application 114, thereby allowing the management application 114 to identify the scanned computing device. In another non-limiting example, at least one Quick Response ("QR") code may be displayed in at least one location in a geographic location. At least one of the computing devices 104a-c may include QR scanning functionality. At least one of the computing devices 104a-c can scan the QR code displayed in the geographic location. Data from the QR scanner can be communicated to the management application 114, thereby allowing the management application 114 to identify the computing device(s) scanning the QR code as available for management. In another non-limiting example, at least one QR scanner may be positioned at a respective location in a geographic location. Each of the computing devices 104a-c may display a QR identifier or have a QR identifier affixed to the computing device. The QR identifier can be scanned by a QR scanner. Data from the QR scanner identifying the scanned computing devices can be communicated to the management application 114, thereby allowing the management application 114 to identify the scanned computing device.

In some embodiments, a control device 302 or other sensor device can be configured to establish radio communication with the computing devices 104a-c via at least NFC process. Non-limiting examples of NFC processes include touching each of the computing devices 104a-c to the control device 302 or another sensor device and/or bringing each of the computing devices 104a-c into close proximity with the control device 302 or another sensor device. In some embodiments, the management application 114 can detect or otherwise determine that the computing devices 104a-c are positioned in a common geographic location by accessing the global positioning system ("GPS") coordinates for each of the computing devices 104a-c. In some embodiments, the management application 114 can determine that computing devices 104a-c such as smart phones are positioned in a common geographic location by triangulating the position of each computing device based on the distance of the computing device from each of multiple base stations in a telecommunication system.

In some embodiments, identifying the computing devices can include determining that a respective application at each computing device is accessing a common collaborative session via the network 106. For example, each of the computing devices 104a-c may be executing a respective application for accessing a web meeting or other media conference. The management application 114 can identify the computing devices 104a-c based on one or more identifiers provided for accessing the collaborative session, such as an internet protocol ("IP") address and/or MAC address associated with each of the computing devices 104a-c.

The method 400 further involves determining that each computing device is executing an instance of a client application that can communicate with the management application and can control computing resources of the computing device, as shown in block 420. For example, the management application 114 can determine that the computing devices 104a-c are respectively executing the client applications 124a-c.

In some embodiments, the client applications 124a-c may be installed on the respective computing devices 104a-c prior to the management application 114 establishing communication with the computing devices 104a-c. If an instance of the client application 124 is not installed to a computing device, the management application 114 may be unable to detect the device or establish communication with the device. In some embodiments, the management application 114 may be configured to push an instance of the client application 124 to a computing devices on which the client application is not installed. The instance of the client application 124 may automatically be installed to the computing device 104 without intervention by an operator of the computing device 104. Additionally or alternatively, the computing device 104 may provide a prompt to the operator requesting authorization to install the instance of the client application 124. Upon the operator affirming that the client application 124 may be installed, the computing device 104 can install the instance of the client application.

The method 400 further involves configuring a respective computing resource of each computing device such that the computing device is restricted to accessing a common resource via communication between the management application and the instance of the client application, as shown in block 430. For example, the management application 114 can communicate with the client applications 124a-c to control one or more of the processors, memory, display devices, and/or I/O devices of the computing devices 104a-c.

Restricting the computing devices 104a-c to accessing a common resource can additionally or alternatively include restricting the computing devices to access a common document, file, or other dataset selected via the management application 114. In some embodiments, each of the computing devices 104a-c may be prevented from accessing a portion of the file that is different from an additional portion of the file accessed by a different one of the computing devices 104a-c. For example, each of the computing devices 104a-c may be associated with a passenger on the same airline flight. Prior to takeoff, the management application 114 can broadcast or otherwise transmit the commands 306a-c directing the client applications 124a-c to access an airline safety video provided via the network 106. The commands 306a-c can direct the client applications 124a-c to prevent the computing devices 104a-c from accessing any other application or file during the playback of the safety video. The commands 306a-c can also direct the client applications 124a-c to prevent the computing devices 104a-c from fast-forwarding, pausing, or otherwise modifying the playback of the safety video.

In some embodiments, each of the computing devices 104a-c may independently access the file such that each computing device is permitted to access a portion of the file that is different from an additional portion of the file accessed by a different one of the computing devices. For example, each of the computing devices 104a-c may be associated with a student enrolled in a college course. During a classroom session, a professor operating the control device 302 can request that the management application 114 take control of the computing devices 104a-c for the purpose of displaying course materials provided via the network 106, such as a map of a country of interest. The management application 114 can broadcast or otherwise transmit the commands 306a-c directing the client applications 124a-c to access the course materials. The commands 306a-c can direct the client applications 124a-c to prevent the computing devices 104a-c from accessing any other application or file during presentation of the provided course materials. The commands 306a-c can also direct the client applications 124a-c to permit each of the computing devices 104a-c to independently browse to different portions of the course material and/or to change the display of portions of the course materials, such as by zooming in on a portion of a map.

Restricting the computing devices 104a-c to accessing a common resource can additionally or alternatively include restricting the computing devices to execute a common application selected via the management application 114. In some embodiments, each of the computing devices 104a-c may be restricted to performing the same functions of the common application. A computing device 104a may be prevented from performing an application function that is different from application functions being performed by the computing devices 104b, 104c. For example, each of the computing devices 104a-c may be associated with a student enrolled in a college course. During a classroom session, a professor operating the control device 302 can request that the management application 114 take control of the computing devices 104a-c for the purpose of executing test-taking software at each of the computing devices 104a-c. Each of the client applications 124a-c may restrict the respective computing devices 104a-c to performing specific functions of the test-taking software, such as typing or selecting an answer for a given question.

In some embodiments, a control device 302 can be used to identify the common resource to which the computing devices 104a-c are restricted. For example, the management application can render and/or cause another application to render a graphical interface for display at a touch screen or other display device of the control device 302. A visual representation of the common resource (e.g., a thumbnail, icon, etc.) can be positioned in the graphical interface based on input received to the control device 302. For example, a professor operating the control device 302 can drag content to be displayed at managed student devices into a window or other portion of a graphical interface operable with the management application 114. The computing devices 104a-c can be restricted to accessing the resource corresponding to the visual representation as positioned in the graphical interface.

In some embodiments, at least one of the computing devices 104a-c can be configured to record or otherwise store data regarding a common resource during a time period in which the computing device is controlled by the client application 124a-c. At least one of the commands 306a-c can direct a respective one of the computing devices 104a-c to record or otherwise store the data. Non-limiting examples of such data include generating a video record of the common resource as rendered at a graphical interface 210, generating a log recording modification or other use of the common resource, generating a record of communication between the management application 114 and a respective one of the client applications 124a-c, and the like.

In some embodiments, each of the computing devices 104a-c may independently use the application such that each computing device is permitted to independently perform different functions provided by the application. For example, each of the computing devices 104a-c may be associated with a student enrolled in a college course. During a classroom session, a professor operating the control device 302 can request that the management application 114 take control of the computing devices 104a-c for the purpose of accessing a particular website at each of the computing device 104a-c. Each of the client applications 124a-c may permit the respective computing devices 104a-c to independently browse different sections of the website and/or utilize any feature provided by the website.

Figure 5:
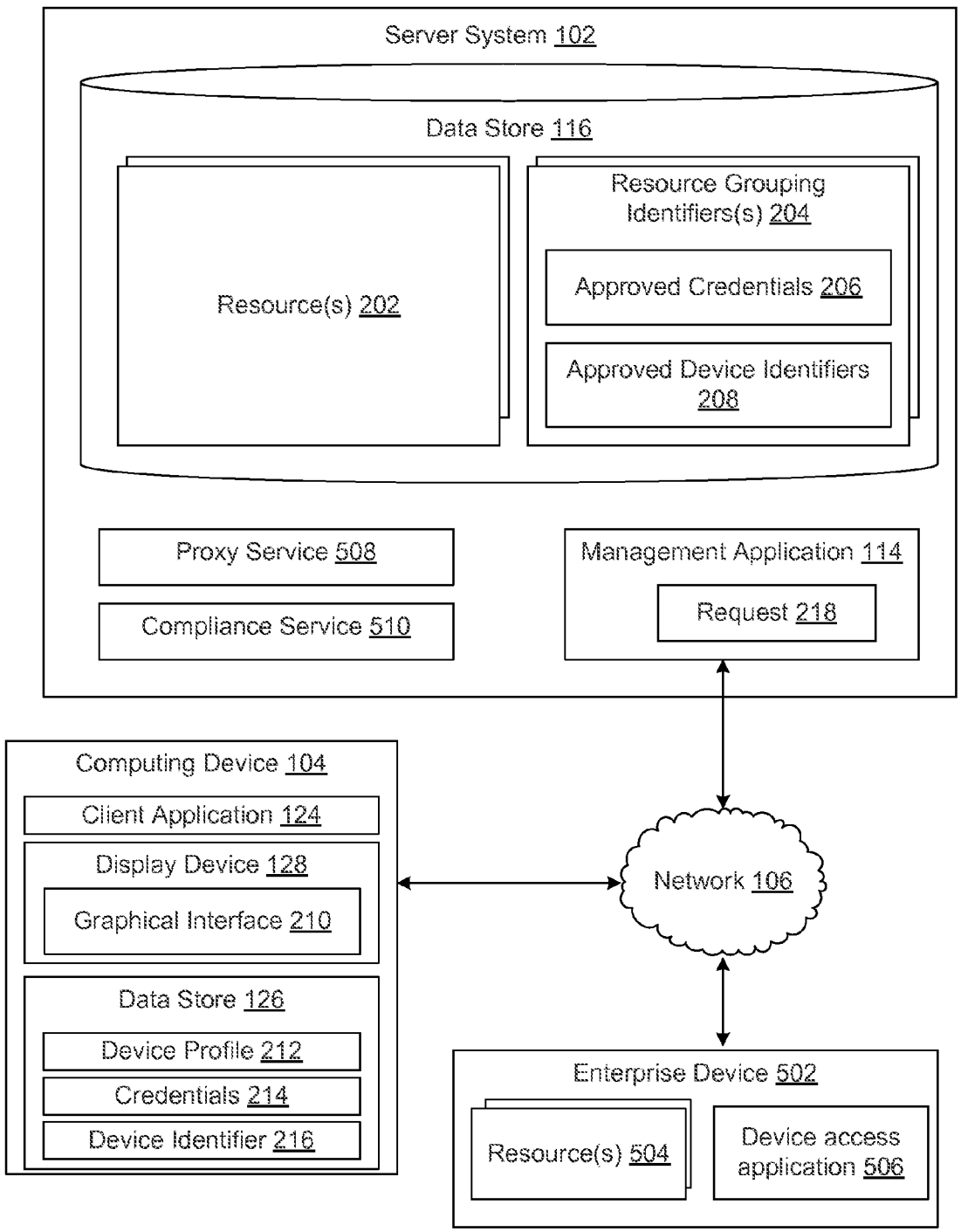
FIG. 5 is a modeling diagram depicting an enterprise device storing enterprise resources provided to a computing device via a server system, according to some embodiments.

Although the description of FIGS. 1-4 involves the server system 102 providing at least one of the resources 202, other implementations are possible. For example, FIG. 5 depicts an enterprise device 502 storing enterprise resources 504 provided to a computing device 104 via the server system 102. The client application 124 may be executed at the computing device 104 to transmit a request for access to the enterprise resources 504 available on the enterprise device 502. The computing device 104 may be configured to execute client side applications such as, for example, a browser, email applications, instant message applications, and/or other applications. For instance, the browser may be executed in the computing device 104 to access and render network pages, such as web pages, or other network content served up by the server system 102, the enterprise device 502, and/or any other computing system.

In some embodiments, the enterprise device 502 may be an enterprise level computing device that stores and provides enterprise resources 504, and/or performs other enterprise level functions. For instance, the enterprise device 502 may store in memory enterprise resources 504, a listing of approved enterprise access credentials, and other data. The enterprise resources 504 may be stored in the device, a database accessible by the device, and/or other storage facility in data communication with the enterprise device 502. In some embodiments, the enterprise resources 504 may include any type of enterprise data, such as, for instance, enterprise documents, files, file systems, and/or any other type of data. The enterprise resources 504 may be accessed and executed on an accessing device. For instance, a user operating the accessing device (e.g., computing device 104) may invoke and execute the enterprise level application. The listing of approved enterprise access credentials may be a list of pre-approved enterprise access credentials that provide access to the enterprise resources 504.

The enterprise device 502 may further be configured to execute various applications such as a device access application 506. The device access application 506 may be executed to receive a request for access to the enterprise resources 504 and determine whether to grant the requested access. For instance, the device access application 506 may receive the request for access from the computing device 104, the server system 102, and/or any other computing system. In response, the device access application 506 may determine whether the enterprise access credentials associated with the requesting device match at least one of the credentials included in a listing of approved enterprise access credentials stored at the enterprise device 502. Upon determining that the enterprise access credentials match approved enterprise access credentials, the device access application 506 may grant the requesting device access to the enterprise resources 504. In some embodiments, the enterprise device 502 may be configured to execute other enterprise side applications and/or services such as, for example, a mail service, an internet service, a messaging service, and/or other services.

In some embodiments, the server system 102 can include a proxy server function and/or a compliance server function. The proxy server function may include providing a proxy service 508. As used herein, the term "proxy service" is used to refer to computer-executable instructions for performing the at least one function for authenticating access credentials and device identifiers. The proxy service 508 may be executed to receive an access request from a computing device for accessing resources 202 and to determine whether to grant or deny the access request. Based on determining that the access request is granted, the proxy service 508 may associate a computing device with access credentials to access resources (e.g., resources 202 and/or 504) provided by or accessible via the server system 102.

The proxy server function may communicate with a compliance server function, such as a compliance service 510, to authorize a computing device 104 by determining whether the computing device 104 complies with hardware, software, device management restrictions, and the like, as defined in a set of compliance rules. As used herein, the term "compliance service" is used to refer to computer-executable instructions for performing the functionality described herein for authorizing the device characteristics of the requesting device. The compliance service 510 is executed to determine whether the device characteristics of a computing device 104 comply with compliance rules that are stored in the data store 116. For instance, the compliance service 510 may identify the device characteristics from a device profile listing of hardware restrictions, software restrictions, and/or computing device management restrictions for a given computing device.

Although the server system 102 is depicted as a single server in FIGS. 1-2 and 5 for purposes of simplicity, the server system 102 can include multiple servers performing multiple functions.

The server system 102 may authorize the computing device 104 for accessing the enterprise resources 504. In some embodiments, the compliance service 510 executed on the server system 102 can authorize the computing device 104 by determining whether the device characteristics of the computing device 104 comply with compliance rules stored at the server system 102. For instance, the compliance service can identify the device characteristics of the computing device 104 from the device profile 212. The compliance service can analyze the device characteristics to determine whether the software restrictions, hardware restrictions, and/or device management restrictions defined in the compliance rules stored at the server system 102 are satisfied and return the result of the determination to the proxy service 508.

In some embodiments, a proxy service 508 executed at the server system 102 may determine whether the computing device 104 complies with the compliance rules. If the proxy service 508 determines or receives a determination that the computing device 104 is authorized, the proxy service 508 can associate the computing device 104 with at least one enterprise access credential. In some embodiments, the proxy service 508 modifies the access request 218 transmitted by the client application 124 by replacing the credential 214 with at least one enterprise access credential. In some embodiments, the proxy service 508 may modify the access request 218 by replacing the device identifier 216. The proxy service 508 can relay the access request 218 with the approved enterprise access credentials to the enterprise device 502 for processing.

In some embodiments, the device access application 506 executed by the enterprise device 502 receives the modified access request 218 from a proxy service 508 executed at the server system 102 and serves up the requested enterprise resources 504 to the proxy service 508. For instance, the device access application 506 determines whether the enterprise access credentials inserted to the access request 218 matches at least one of the approved enterprise access credentials. Upon determining that the enterprise access credentials match one of the approved enterprise access credentials, the device access application 506 serves up the requested quantity of enterprise resources 504. In response, the proxy service 508 relays the requested enterprise resources 504 to the computing device 104. In some embodiments, the device access application 506 may serve up the requested enterprise resources 504 directly to the computing device 104.

Figure 6:
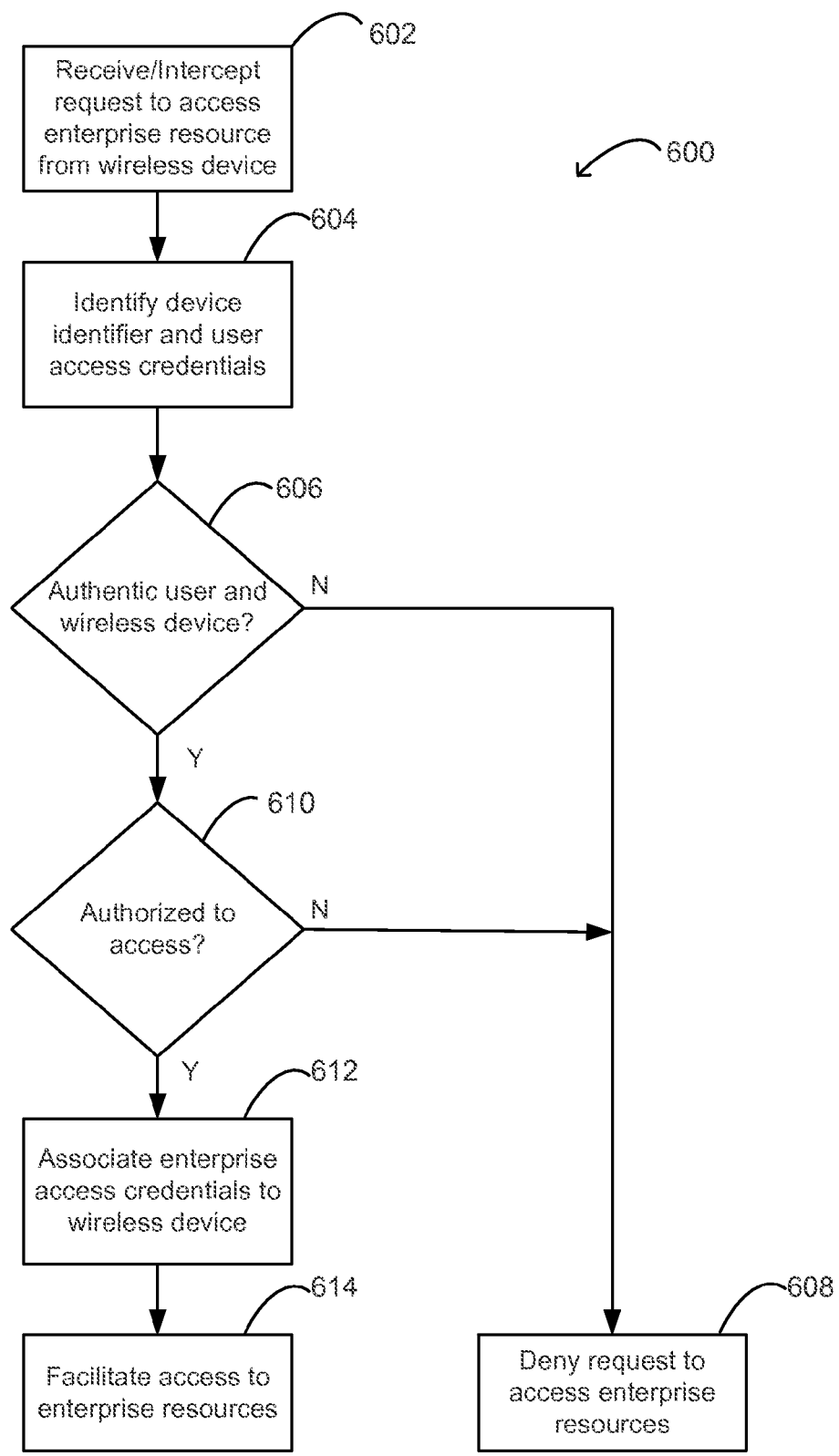
FIG. 6 is a flowchart illustrating an example method for authenticating a computing device performed by a proxy service according to some embodiments.

FIG. 6 is a flowchart illustrating an example method 600 performed by a proxy service 508 for authenticating a computing device 104. For illustrative purposes, the method 600 is described with reference to the system implementations depicted in FIGS. 1, 2 and 5

The method 600 involves the proxy service 508 receiving an access request 218 from the client application 124 executed by a computing device 104 to access enterprise resources 504 served up by the enterprise device 502, as depicted in block 602.

The method 600 further involves the proxy service 508 identifying a device identifier 216 associated with the computing device 104 and the credential 214 of the user operating the computing device 104, as depicted in block 604. In some embodiments, the device identifier 216 and the credential 214 may be received by the proxy service 508 in conjunction with the request 218. In some embodiments, the proxy service 508 may separately request the device identifier 216 and the credential 214 from the computing device 104.

The method 600 further involves the proxy service 508 determining whether the computing device 104 and the user operating the computing device 104 are authentic, as depicted in block 606. In some embodiments, the proxy service 508 determines whether device identifier 216 associated with the computing device 104 matches one of the identifiers included in the listing of approved device identifiers 208. Additionally, the proxy service 508 determines whether the credential 214 associated with the user matches one of the credentials included in the approved credentials 206.

If the proxy service 508 is unable to respectively match either one of the device identifier 216 and the credential 214 with the approved device identifiers 208 and the approved credentials 206, the proxy service 508 denies the access request 218 to access the enterprise resources 504, as depicted in block 608.

If the proxy service 508 matches both the device identifier 216 and the credential 214 with the approved device identifiers 208 and the approved credentials 206, respectively, the proxy service 508 determines whether the computing device 104 is authorized to access the requested enterprise resources 504, as depicted in block 610. The proxy service 508 may communicate with a compliance service 510 executed at the server system 102 to determine whether the computing device 104 is authorized to access the enterprise resources 504 on the enterprise device 502, as described above.

If the proxy service 508 determines that the computing device 104 is not authorized, the proxy service 508 denies the request 218 to access the enterprise resources 504, as depicted in block 608.

If the proxy service 508 determines that the computing device 104 is authorized to access the enterprise resources 504, the proxy service 508 associates one set of enterprise access credentials with the access request 218, as depicted in block 612. For instance, the proxy service 508 may modify the original access request 218 transmitted by the client application 124 to remove the credential 214 and insert the enterprise access credentials.

The method 600 further involves the proxy service 508 facilitating access to the enterprise resources 504 for the computing device 104, as depicted in block 614. In some embodiments, the proxy service 508 relays the modified access request 218 to the device access application 506 of the enterprise device 502. In response, the proxy service 508 may receive the requested enterprise resources 504 from the device access application 506 if the enterprise access credentials match one of the approved enterprise access credentials. Upon receiving the requested enterprise resources 504, the proxy service 508 may communicate the requested enterprise resources 504 to the client application 124. In some embodiments, the device access application 506 may communicate the requested enterprise resources 504 directly to the client application 124.

Figure 7:
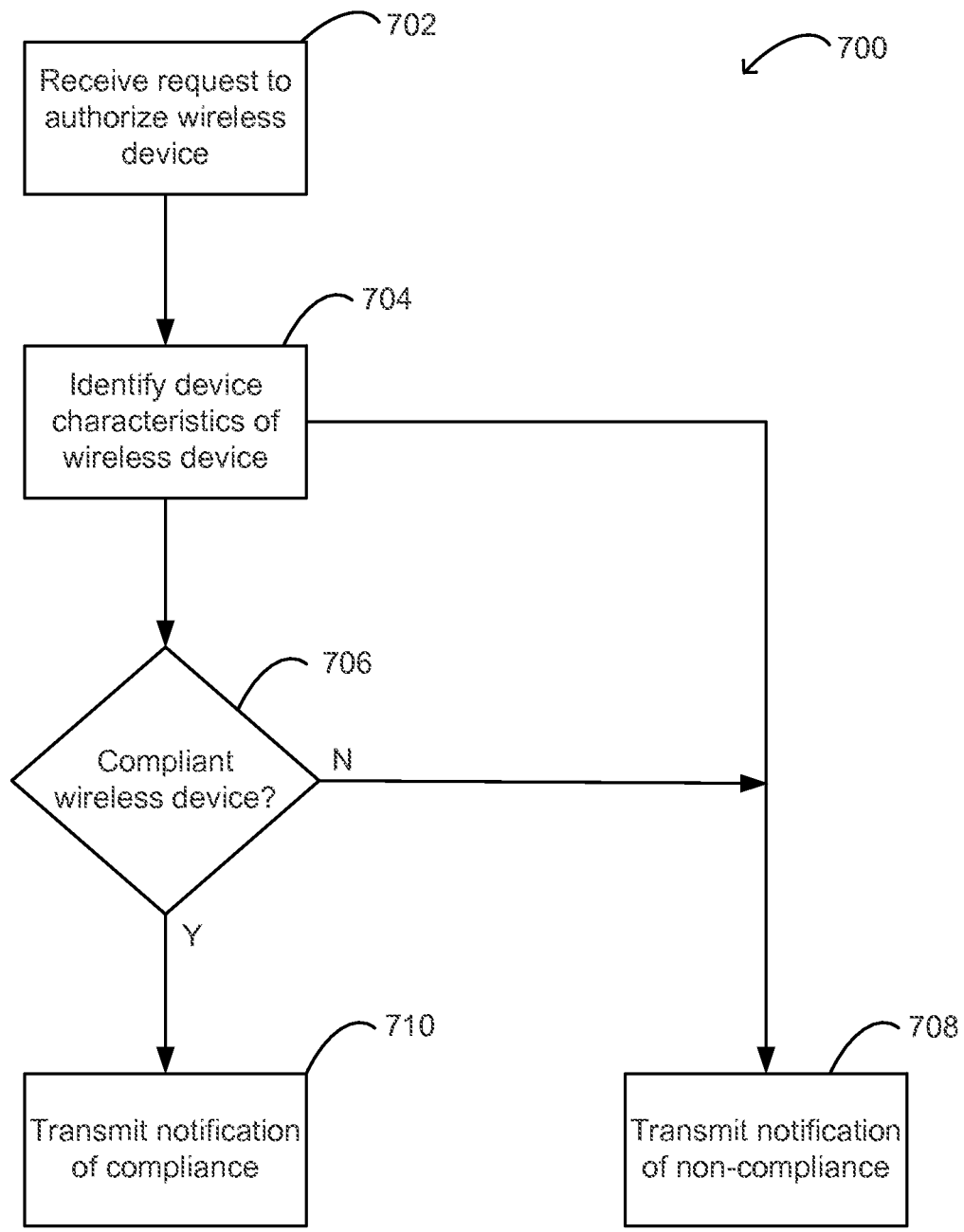
FIG. 7 is a flow chart depicting an example method for authenticating a computing device performed by a compliance service according to some embodiments.

FIG. 7 is a flow chart depicting an example of an example method 700 performed by a compliance service 510 for authenticating a computing device 104. For illustrative purposes, the method 700 is described with reference to the system implementations depicted in FIGS. 1, 2 and 5. Other implementations, however, are possible.

The method 700 involves the compliance service 510 receiving a request from the proxy service 508 to authorize a computing device 104 for accessing enterprise resources 504 provided by the enterprise device 502, as depicted in block 702. The method 700 further involves the compliance service 510 identifying the device characteristics of the computing device 104, as depicted in block 704. For instance, the compliance service 510 may determine the device characteristics from the device profile 212 of the computing device 104. In some embodiments, the compliance service 510 may receive the device profile 212 from a proxy service 508 executed by the server system 102 in conjunction with the access request 218. In some embodiments, the compliance service 510 may transmit a request to the computing device 104 to receive the device profile 212. In some embodiments, the device profile 212 of each computing device 104 in a networked environment may be stored in the data store 116 of the server system 102. The compliance service 510 may access the local copy of the device profile 212. The local copy of the device profile 212 may be periodically updated from the respective computing device 104.

The method 700 further involves the compliance service 510 determining whether the computing device 104 is compliant with at least one compliance rule and is therefore authorized to access the enterprise resources 504, as depicted in block 706. In some embodiments, the compliance service 510 determines that the computing device 104 is compliant if the device characteristics of the computing device 104 satisfy compliance rules stored at the server system 102 required for accessing the enterprise device 502. For instance, the compliance rules stored at the server system 102 may comprise hardware restrictions, software restrictions, and device management restrictions.

If the compliance service 510 determines that the computing device 104 is not compliant, the compliance service 510 transmits a notification that the computing device 104 failed the compliance check, as depicted in block 708.

If the compliance service 510 determines that the wireless device is compliant, the compliance service 510 transmits a notification to the proxy service 508 that the computing device 104 passed the compliance check, as depicted in block 710.

In some embodiments, one or more compliance and/or authorization processes described above with respect to FIGS. 5-7 can be performed prior to allowing at least one of the computing devices 104a-c to access the resources 202. In some embodiments, the computing devices 104a-c may access the resources 202 without some or all of the compliance and/or authorization processes described above with respect to FIGS. 5-7 being performed.

General Considerations

The foregoing description of the aspects, including illustrated examples, has been presented only for the purpose of illustration and description and is not intended to be exhaustive or limiting to the precise forms disclosed. Many variations and modifications may be made to the above-described examples without departing substantially from the spirit and principles of the disclosure. All such modifications and variations are intended to be included herein within the scope of this disclosure and protected by the following claims.

The flowcharts described herein show certain functionality and operations performed by the management application 114, client application 124, proxy service 508 and compliance service 510, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 108 and 118 in a computer system or other system. The machine code may be converted from the source code, etc. If embodied in hardware, each block may represent a circuit or a number of interconnected circuits to implement the specified logical function(s).

Although the flowcharts described herein show a specific order of execution, it is understood that the order of execution may differ from that which is depicted. For example, the order of execution of two or more steps may be scrambled relative to the order shown. Also, two or more blocks shown in succession in the flow charts may be executed concurrently or with partial concurrence. Further, in some embodiments, one or more of the steps shown in the flow charts may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Any logic or application described herein that comprises software or code can be embodied in any non-transitory computer-readable medium for use by or in connection with a computing system such as, for example, a processor in a computer system or other system. In this sense, the logic may comprise, for example, statements including instructions and declarations that can be fetched from the computer-readable medium and executed by a computing system.

In the context of the present disclosure, a "computer-readable medium" can include any medium that can contain, store, maintain, or otherwise include the logic or application described herein for use by or in connection with a computing system. The computer-readable medium can comprise any one of many physical media such as, for example, magnetic, optical, or semiconductor media. More specific examples of a suitable computer-readable medium can include, but are not limited to, magnetic tapes, magnetic floppy diskettes, magnetic hard drives, memory cards, solid-state drives, USB flash drives, optical discs, etc. The computer readable medium may be a random access memory ("RAM"). Examples of a RAM can include (but are not limited to) static random access memory ("SRAM"), dynamic random access memory ("DRAM"), magnetic random access memory ("MRAM"), etc. The computer-readable medium may be a read-only memory ("ROM"), a programmable read-only memory ("PROM"), an erasable programmable read-only memory ("EPROM"), an electrically erasable programmable read-only memory ("EEPROM"), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and the following claims.

Therefore, the following is claimed:

1. A method comprising:
determining, by a management application executed on a processor, that computing devices are available for management;
determining, by the management application, that one or more computing devices are executing a respective instance of a client application, wherein the client application is configured to communicate with the management application and is further configured to control at least one respective computing resource; and
configuring, by the management application, the at least one respective computing resource such that at least one of the computing devices is restricted to accessing at least one common resource and prevented, for a duration in which the at least one common resource is being accessed, from accessing any other resource than the at least one common resource, wherein the at least one computing device is configured through communication between the management application and the respective instance of the client application.

2. The method of claim 1, wherein determining that computing devices are available for management comprises determining that the computing devices are grouped in a common organizational unit of a directory service.

3. The method of claim 1, wherein determining that computing devices are available for management comprises determining that the computing devices are positioned in a common geographic location.

4. The method of claim 3, wherein determining that the computing devices are positioned in the common geographic location comprises determining that the computing devices are registered with the management application through a sensor device positioned in the common geographic location.

5. The method of claim 1, wherein determining that computing devices are available for management comprises determining that a respective application at the computing devices is accessing a common collaborative session via a data network.

6. The method of claim 1, wherein configuring the at least one respective computing resource of the computing devices such that the computing device is restricted to accessing the at least one common resource is performed based on identifying at least one attribute common to a plurality of entities, wherein each of the plurality of entities is associated with a respective one of the computing devices.

7. The method of claim 1, wherein configuring the at least one respective computing resource comprises configuring the at least one respective computing resource to access a file selected via the management application.

8. The method of claim 7, further comprising configuring, by the management application, the at least one respective computing resource such that the computing device is prevented from accessing a portion of the file that is different from an additional portion of the file accessed by a different one of the computing devices.

9. The method of claim 7, further comprising configuring, by the management application, the at least one respective computing resource such that the computing device is permitted to access a portion of the file that is different from an additional portion of the file accessed by a different one of the computing devices.

10. The method of claim 1, wherein configuring the at least one respective computing resource comprises configuring the at least one respective computing resource to execute an application selected via the management application.

11. The method of claim 10, further comprising configuring, by the management application, the at least one respective computing resource such that the computing device is prevented from performing a function of the application that is different from an additional function of the application performed by a different one of the computing devices.

12. The method of claim 10, further comprising configuring the at least one respective computing resource such that the computing device is permitted to perform a function of the application that is different from an additional function of the application performed by a different one of the computing devices.

13. A system comprising:
a processor;
a touch screen device in communication with the processor; and
a computer-readable medium in communication with the processor;
wherein the processor is configured to execute a management application stored in the computer-readable medium for performing operations comprising:
determining that one or more computing devices are executing a respective instance of a client application, wherein the client application is configured to communicate with the management application and is further configured to control at least one respective computing resource;

selecting at least one computing device based on at least one input received to the touch screen device; and configuring at least one respective computing resource of the at least one computing device such that the at least one computing device is restricted to accessing at least one resource managed by the management application and prevented, for a duration in which the at least one resource is being accessed, from accessing any other resource than the at least one resource that is managed, wherein the at least one computing device is configured via communication between the management application and a respective instance of the client application executed at the at least one computing device.

14. The system of claim 13, wherein the processor is further configured for distributing the at least one resource from the computer-readable medium to the at least one computing device.

15. The system of claim 13, further comprising at least one transceiver configured to perform near-field communication with the computing devices, wherein the processor is configured for determining that at least one of the computing devices is executing the respective instance of the client application based on the near-field communication with the computing devices.

16. The system of claim 13, wherein the processor is further configured for:

rendering a graphical interface for display on the touch screen device; and positioning a visual representation of the at least one resource in the graphical interface based on at least one selection input selecting the at least one resource and received via the touch screen device;

wherein the configuring the at least one respective computing resource such that the at least one computing device is restricted to accessing the at least one resource is performed in response to positioning the visual representation of the at least one resource in the graphical interface.

17. A system comprising:

a processor;

an input device in communication with the processor; and a computer-readable medium in communication with the processor;

wherein the processor is configured to execute a client application stored in the computer-readable medium for performing operations comprising:

initiating control of at least one computing resource of the system, wherein the at least one computing resource is configured for executing at least one command in response to at least one input received via the input device; and configuring the at least one computing resource such that the processor is restricted to accessing at least one resource managed by a management application and prevented, for a duration in which the at least one common resource is being accessed, from accessing any other resource in response to receiving a command from the management application.

18. The system of claim 17, wherein the processor is further configured for:

receiving an additional command to access at least one additional resource other than the at least one resource managed by the management application; and disabling the command to access the at least one additional resource.

19. The system of claim 17, wherein the processor is further configured for storing, in the computer-readable medium, data describing at least one operation performed at the system while accessing the at least one resource managed by the management application.

20. The system of claim 17, further comprising at least one transceiver configured to perform near-field communication with an additional computing device configured for accessing the management application, wherein the processor is further configured to identify the system to the management application via the near-field communication with the additional computing device.

* * * * *